June 5, 1956  J. J. TWARDOWSKI  2,748,488
INSTRUMENT FOR SETTING DIAL GAUGES
Filed March 24, 1955  2 Sheets-Sheet 1
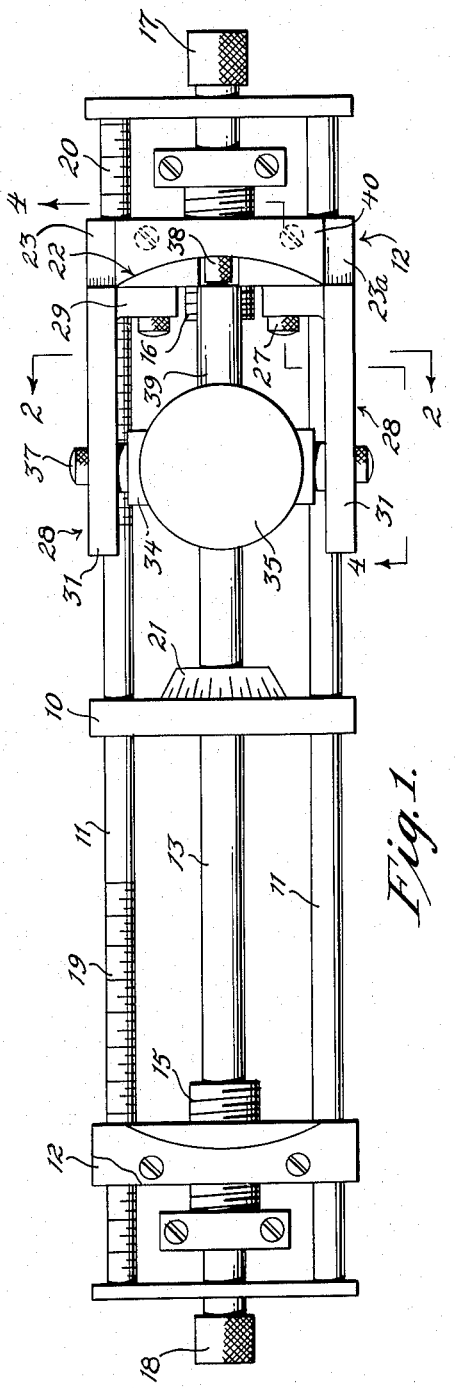
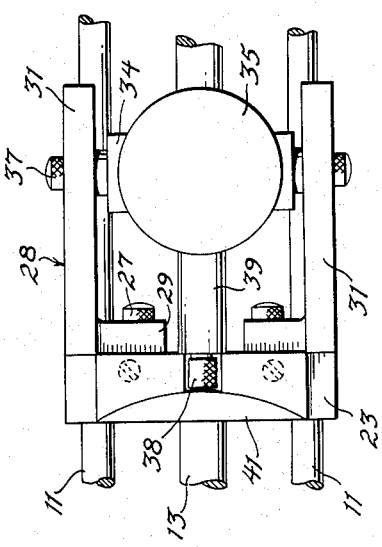
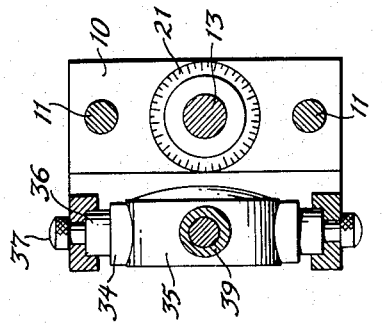
INVENTOR.
JOHN J. TWARDOWSKI
BY Joshua R. H. Potts
HIS ATTORNEY.

June 5, 1956 J. J. TWARDOWSKI 2,748,488
INSTRUMENT FOR SETTING DIAL GAUGES
Filed March 24, 1955 2 Sheets—Sheet 2

INVENTOR.
JOHN J. TWARDOWSKI
BY
Joshua H. Potts
HIS ATTORNEY.

United States Patent Office 2,748,488
Patented June 5, 1956

2,748,488

INSTRUMENT FOR SETTING DIAL GAUGES

John J. Twardowski, New York, N. Y.

Application March 24, 1955, Serial No. 496,455

5 Claims. (Cl. 33—147)

This invention relates to precision measuring instruments, and more particularly to a device for setting dial gauges on precision measuring instruments, which affords certain improvements over the measuring instrument described in my copending application S. N. 496,454 filed March 24, 1955.

Prior to the present invention it was necessary in setting dial gauges to the zero point for a particular diameter to use a pair of set blocks. These set blocks are formed with opposed arcuate surfaces corresponding to a predetermined diameter and, since they are machined to a high degree of accuracy, are costly of manufacture. Furthermore, when set blocks are used they must be set in a relatively immobile base, usually a heavy casting, and a machinist is required to leave his work place for the purpose of setting a dial gauge. Moreover, it sometimes occurs that a setting, once obtained on conventional set blocks, is lost due to inevitable vibration incident to carrying the gauge back to the work place.

A principal object of the invention, therefore, is to provide a precision instrument for accurately setting dial gauges in which but one set block is required.

A further object of the invention is to provide a device of the stated type of convenient form and improved functional characteristics.

Another object of the invention is to provide a device of the mentioned character by means of which a dial gauge may be set at the work place.

A further object of the invention is to provide an instrument for accurately setting dial gauges which is characterized by ease and economy of manufacture.

A still further object of the invention is to provide a device of the stated character which may easily be operated by a person of limited skill and manual dexterity.

A final object of the invention is to provide an instrument of the stated type which is convenient of handling and which is capable of accurate setting under all conditions of use.

These and other objects of the invention will become apparent as the description proceeds, reference being made to the accompanying specification wherein similar reference characters denote similar elements throughout the several views:

Figure 1 is a bottom plan view of a precision instrument made in accordance with the present invention, illustrating the device used for setting the dial gauge to zero in measuring internal diameters.

Figure 2 is an elevational view, partly in section, taken substantially along the line 2—2 of Fig. 1.

Figure 2a is a partial bottom plan view of the precision instrument similar to the showing of Fig. 1, but illustrating the gauge-setting device for setting the dial to zero in measuring external diameters.

Figure 4:
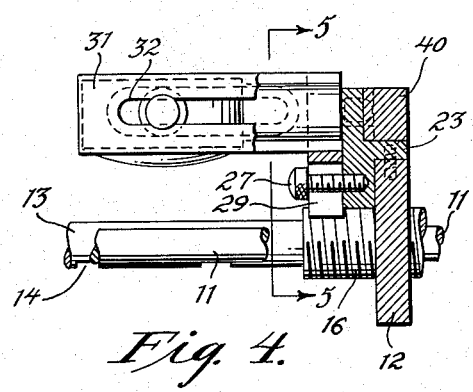
Figure 4 is an elevational view, partly in section, taken along the line 4—4 of Fig. 1.

With reference to the drawing, and more particularly to Fig. 1, the embodiment of the invention disclosed therein comprises essentially a measuring instrument of the type disclosed in my above-mentioned copending application. This instrument includes a stationary member 10 having affixed thereto a pair of parallel guide bars 11 on which is slidably mounted a pair of spaced end blocks 12, one on each side of the central member 10. An adjusting bar 13 is centrally mounted between the guide bars 11 for rotation with respect to the member 10. On the top side of the bar 13 a plurality of longitudinally spaced flat recesses 14 is provided, as shown in Fig. 4, for the selective positioning of a pair of oppositely threaded sleeves 15, 16, which engage correspondingly threaded apertures in the end blocks 12 for movement of the end blocks toward or away from the central member 10 as desired. For convenient rotation of the adjusting bar 13 a pair of knurled knobs 17, 18 is mounted at opposite ends of the bar. Upon rotation of the bar 13 in a particular direction the end blocks 12 move simultaneously toward or away from the central member 10, as the case may be, and the distance between the inner faces of the end blocks 12 at a particular moment is accurately indicated concurrently on scales 19, 20, which are calibrated to indicate precisely the distance between the opposed inner faces of the end blocks 12 to the nearest one-hundredth of an inch. Accuracy to thousandths of an inch is obtained by a vernier dial 21 fixed to the adjusting bar 13 at one side of the member 10. The reading on the vernier dial 21 is added to the scale reading to obtain the desired measurement, as will be understood.

Figure 3:
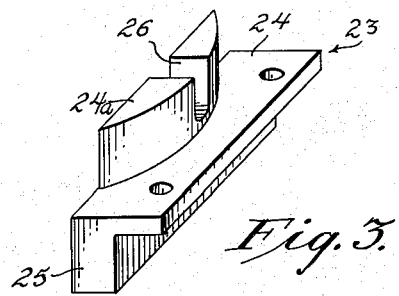
Figure 3 is a perspective view of the gauge block used for measuring internal diameters.
Figure 3A:
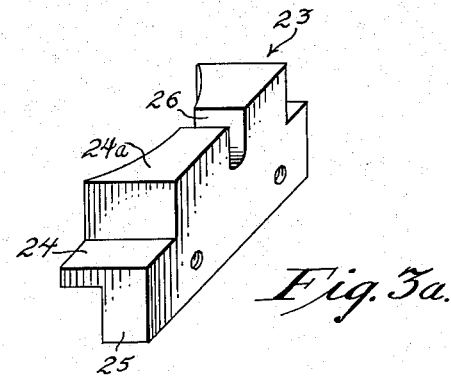
Figure 3a is a perspective view of the gauge block used for measuring external diameters.
Figure 5:
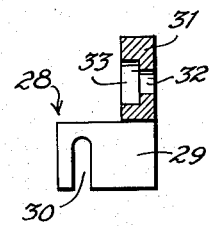
Figure 5 is an elevational view, partly in section, taken along the line 5—5 of Fig. 4.

According to the present invention, means are provided for mounting a dial gauge in predetermined fixed relation to the instrument for the purpose of setting the dial gauge to the required zero reading. In the present instance, this means takes the form of an assembly, indicated generally by reference character 22, which, as shown best in Figs. 3 and 3a, comprises a substantially L-shaped attachment 23 having a horizontal leg 24 for engagement with the bottom surface of one of the end blocks 12, and a vertical leg 25 in abutment with the inner face of the end block 12. The perpendicular arrangement of the contacting surfaces of the attachment 23 affords an accurate fit with the corresponding surfaces of the end block, and relative movement between these elements is precluded once the attachment is affixed by means of setscrews. On the top surface of the leg 24 is disposed an arcuate projection 24a formed integrally with the attachment 23. A slot 26 is formed in this projection for a purpose hereafter described. Affixed to one side of the attachment 23 by a pair of thumbscrews 27 is a pair of L-shaped brackets 28. Each of these brackets is formed with a leg 29 having a vertically extending slot 30 for vertical adjustability of the brackets 28 with respect to the attachment 23, as shown clearly in Fig. 5. With reference now to Fig. 4, each bracket 28 includes a leg 31 substantially longer than the leg 29, and provided with an elongated slot 32, communicating with a recess 33 on the inner face of the bracket, as shown in Fig. 5. In these recesses 33 are positioned the outer extremities of a pair of mounting blocks 34 for a dial gauge 35, as in Fig. 2. The mounting blocks 34 are formed arcuately to conform to the configuration of the dial gauge, to which the blocks are secured by any suitable means, such as brazing. The outer ends 36 of the mounting blocks are reduced in cross section for reception in the recesses 33. The dial gauge 35 may be secured in any desired position longitudinally of the brackets 28 within the slots 32 of the legs 31 by means of knurled thumbscrews 37. A similar L-shaped attachment 23a is mounted on the other end block 12, as shown in Fig. 1.

Figure 5A:
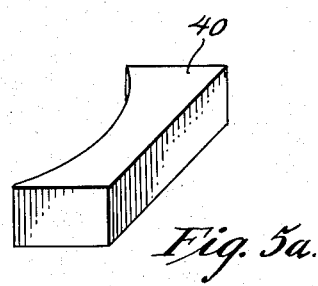
Figure 5a is a perspective view of a set block used in setting the dial gauge to zero for measuring internal diameters.
Figure 5B:
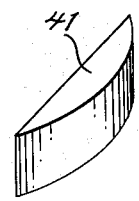
Figure 5b is a perspective view of a set block used in setting the dial gauge to zero for measuring external diameters.

According to an important feature of the present invention the dial gauge 35 is provided with a spring-biased pin 38, mounted axially of a shaft 39. The pin 38 passes through the slot 26 in the projection 24a and into engagement with a set block 40 or 41, shown in Figs. 5a and 5b, which is positioned on the top surface of the attachment 23, as shown in Fig. 1. The set block 40 is used in conjunction with the attachment 23, shown in Fig. 3 for measuring internal diameters, while the set block 41 is used with the attachment 23 shown in Fig. 3a for measuring external diameters.

Operation

While the operation of the instrument of the present invention will no doubt be apparent from the above description of the apparatus, it will be set forth now in greater detail for the sake of clarity. To measure internal diameters, the instrument is assembled in the manner shown in Fig. 1, which is a bottom plan view thereof. A setting for a particular diameter is obtained on the present instrument by rotating either of the knobs 17 or 18 until the desired reading appears on the scales 19, 20 and the vernier dial 21. The attachments 23 and 23a are then secured firmly in position on the end blocks 12 and the brackets 28 attached to one of the end blocks 12, as shown in Fig. 1. The dial gauge 35 is then attached to the said brackets by means of the thumbscrews 37 with the face thereof facing upwardly. It will be noted that in this position, the spring-biased pin 38 is received in the slot 26 of the projection 24a on the attachment 23. A set block 40 is then placed on the top surface of the attachment 23 with its arcuate surface in abutting relationship to the arcuate surface of the projection 24a. The set block 40, in bearing against the projection 24a, will exert a pressure on the pin 38, forcing it inwardly against the biasing spring so that the surface of said pin is tangent with the arcuate surface of the projection 24a. In this condition, the dial may be set to read zero, and the instrument is ready to yield precision measurements of internal diameters. To accomplish this, the set block 40 is now removed, releasing its pressure on the pin 38. A piece whose internal diameter is to be measured is then brought into contact with the instrument so as to envelope the projections 24a. Since the distance between the end blocks 12 which carry the attachments 23 and 23a has previously been regulated to the desired diameter to be measured, any minute deviations from this nominal diameter tending toward a larger diameter will immediately be registered on the dial by virtue of the spring-biased pin 38 extending outwardly of the slot 26 until it contacts the wall of the piece being measured.

External diameters are measured in much the same manner, using the attachments and set-block arrangement shown in Fig. 2a.

Although the present description has been limited to a single embodiment of the invention, other variations are possible without departing from the spirit of the invention. It is, therefore, not intended that the invention be limited to the particular embodiments disclosed, but only to the inventive concept, as defined in the appended claims.

What is claimed is:

1. In an instrument of the character described, in combination, a pair of relatively movable measuring blocks, each of said measuring blocks having an arcuate projection, the arcuate projection of one of said blocks having a slotted opening therein, a dial gauge attached to the block having the projection with a slotted opening therein, a spring-biased pin operably connected to said dial gauge and residing in said slotted opening, and means connected to said block to which the dial gauge is attached for setting the dial gauge to a zero reading.

2. In an instrument of the character described, in combination, a pair of relatively movable measuring blocks, each of said measuring blocks having an arcuate projection, the arcuate projection of one of said blocks having a slotted opening therein, a dial gauge attached to the block having the projection with a slotted opening therein, a spring-biased pin operably connected to said dial gauge and residing in said slotted opening so as to protrude therefrom, and means connected to said block to which the dial gauge is attached and contacting said protruding pin for setting the dial gauge to a zero reading.

3. In an instrument of the character described, in combination, a pair of relatively movable measuring blocks, each of said measuring blocks having an arcuate projection, the arcuate projection of one of said blocks having a slotted opening therein, a dial gauge attached to the block having the projection with a slotted opening therein, a spring-biased pin operable connected to said dial gauge and residing in said slotted opening so as to protrude therefrom, and means connected to said blocks to which the dial gauge is attached and contacting said protruding pin for setting the dial gauge to a zero reading.

4. In an instrument of the character described, in combination, a pair of relatively movable measuring blocks, a gauge-setting assembly mounted on one of said blocks, said assembly including a first L-shaped attachment having an arcuate projection on the top surface thereof, the said arcuate projection having a slotted opening therein, a second L-shaped attachment on the other of said blocks having an arcuate projection on the top surface thereof, a pair of brackets mounted on said first L-shaped attachment for supporting a dial gauge, a dial gauge carried by said brackets, a spring-biased pin operably connected to said dial gauge and residing in said slotted opening so as to protrude therefrom, and a set block carried by the block to which the dial gauge is attached and contacting said protruding pin for setting the dial gauge to a zero reading.

5. In an instrument of the character described, in combination, a pair of relatively movable measuring blocks slidably carried by said guide bars, a gauge-setting assembly mounted on one of said blocks, said assembly including a first L-shaped attachment having an arcuate projection on the top surface thereof, the said arcuate projection having a slotted opening therein, a second L-shaped attachment on the other of said blocks having an arcuate projection on the top surface thereof, a pair of brackets mounted on said first L-shaped attachment for supporting a dial gauge, a dial gauge carried by said brackets, a spring-biased pin operably connected to said dial gauge and residing in said slotted opening so as to protrude therefrom, and a set block carried by the block to which the dial gauge is attached and contacting said protruding pin for setting the dial gauge to a zero reading.

References Cited in the file of this patent

UNITED STATES PATENTS

| | | |
|---|---|---|
| 1,325,943 | Howard | Dec. 23, 1919 |
| 2,558,291 | Eisele | June 26, 1951 |
| 2,578,615 | Twardowski | Dec. 11, 1951 |
| 2,723,460 | Petch | Nov. 15, 1955 |
| 2,725,636 | Green | Dec. 6, 1955 |

OTHER REFERENCES

Publication, Johansson Catalog No. 17, June 1, 1945, pages 18 and 20. Ford Motor Co., Dearborn, Mich.